US011016534B2

(12) United States Patent
Cohen et al.

(10) Patent No.: US 11,016,534 B2
(45) Date of Patent: May 25, 2021

(54) SYSTEM, METHOD, AND RECORDING MEDIUM FOR PREDICTING COGNITIVE STATES OF A SENDER OF AN ELECTRONIC MESSAGE

(71) Applicant: International Business Machines Corporation, Armonk, NY (US)

(72) Inventors: Guy M. Cohen, Ossining, NY (US); Jae-lyn Hecht, Boston, MA (US); James R. Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 814 days.

(21) Appl. No.: 15/140,998

(22) Filed: Apr. 28, 2016

(65) Prior Publication Data
US 2017/0316330 A1 Nov. 2, 2017

(51) Int. Cl.
*G06N 3/08* (2006.01)
*G06N 5/02* (2006.01)
*G06F 1/16* (2006.01)
*H04L 12/58* (2006.01)
*G06F 3/01* (2006.01)

(52) U.S. Cl.
CPC .............. *G06F 1/163* (2013.01); *G06F 3/011* (2013.01); *G06N 3/08* (2013.01); *G06N 5/02* (2013.01); *H04L 51/32* (2013.01); *G06F 2203/011* (2013.01)

(58) Field of Classification Search
CPC .................................. G06N 3/08; G06N 5/02
See application file for complete search history.

(56) References Cited

U.S. PATENT DOCUMENTS

| 7,434,176 B1 | 10/2008 | Froloff |
| 2006/0029198 A1 | 2/2006 | Dorneich et al. |
| 2008/0147574 A1* | 6/2008 | Chidlovskii ...... G06F 17/30705 706/12 |
| 2012/0290512 A1* | 11/2012 | Frank ...................... G06N 20/00 706/12 |
| 2013/0024465 A1 | 1/2013 | Schiff et al. |
| 2013/0143185 A1 | 6/2013 | Liu et al. |

(Continued)

FOREIGN PATENT DOCUMENTS

EP 2 267 696 A1 12/2010

OTHER PUBLICATIONS

Song, Insu, et al.; "Intention Extraction From Text Messages"; School of Business & Information Technology, James Cook University, Australia, Nov. 2010.

*Primary Examiner* — George Giroux
(74) *Attorney, Agent, or Firm* — Anthony Curro, Esq.; McGinn I.P. Law Group, PLLC (57) ABSTRACT

A cognitive state prediction method, system, and non-transitory computer readable medium, include a receiving circuit configured to receive an electronic message sent by a first user, a labeling circuit configured to query a second user to associate a label with the electronic message based on a cognitive state of the first user, and a correlating circuit configured to correlate the label with user data at a time of sending the electronic message, the user data corresponding to data output by at least one of the wearable and an external sensor in a database.

11 Claims, 5 Drawing Sheets

(56) References Cited

U.S. PATENT DOCUMENTS

| | | |
|---|---|---|
| 2015/0046233 A1 | 2/2015 | Srulowitz et al. |
| 2015/0172236 A1 | 6/2015 | Meijer et al. |
| 2015/0178626 A1* | 6/2015 | Pielot ................. G06N 5/04 |
| | | 706/12 |
| 2015/0235655 A1* | 8/2015 | Dimitriadis ........... G10L 25/63 |
| | | 704/270 |
| 2015/0323986 A1 | 11/2015 | Frank et al. |
| 2016/0149849 A1* | 5/2016 | Lukacs ................ H04L 51/22 |
| | | 709/206 |
| 2016/0156579 A1* | 6/2016 | Kaufmann ............ H04L 51/22 |
| | | 709/206 |
| 2016/0259492 A1* | 9/2016 | Le .................. G06F 16/24568 |
| 2016/0359771 A1* | 12/2016 | Sridhar ............. H04M 1/72552 |
| 2017/0116459 A1* | 4/2017 | Chen ................. G06K 9/00604 |
| 2017/0147202 A1* | 5/2017 | Donohue ............ G06F 3/04886 |
| 2017/0168568 A1* | 6/2017 | Petrov ............... G06F 3/015 |

* cited by examiner

SYSTEM, METHOD, AND RECORDING MEDIUM FOR PREDICTING COGNITIVE STATES OF A SENDER OF AN ELECTRONIC MESSAGE

BACKGROUND

The present invention relates generally to a cognitive state prediction system, and more particularly, but not by way of limitation, to a system for predicting a cognitive state of a sender of an electronic message based on user data associated with the electronic message.

Conventionally, when a user of a messaging system sends a message, often the recipient is unaware of the sender's cognitive context, and therefore the content of the message may be hard to interpret and respond to. The recipient relies on existing preconceived notions, memories, focus of attention, and subjective states to determine an interpretation of the message. However, often the recipient has incomplete information and incorrectly interprets the cognitive context of the message.

Conventional techniques attempt to predict a person's cognitive state based on data obtained from wearables or an external device. However, the conventional techniques have a high chance of error due to the lack of human intervention in predicting a cognitive state and the prediction is based on past data.

SUMMARY

The inventors have considered the technical solution to the technical problem in which recipients of messages, upon interpreting the cognitive state, label the message accordingly. These labels are then stored in a database, which also receives wearable or external sensor data about the sender. Analytics applied to the wearables data is used to predict the label in subsequent settings. Specifically, when a user of the system sends a second message to the recipient, the wearable or external sensor data may be analyzed to predict the label according to past training with recipient labels. This solution can allow the recipient to have a machine-generated prediction of a cognitive state of the sender, thus eliminating risks of error, temporary biases, misinterpretation, conflicting memories, and/or noise from the new context in which the message was sent.

In an exemplary embodiment, the present invention can provide a cognitive state prediction system including a receiving circuit configured to receive an electronic message sent by a first user, a labeling circuit configured to query a second user to associate a label with the electronic message based on a cognitive state of the first user, and a correlating circuit configured to correlate the label with user data at a time of sending the electronic message, the user data corresponding to data output by at least one of a wearable, and an external sensor in a database.

Further, in another exemplary embodiment, the present invention can provide a cognitive state prediction method including receiving an electronic message sent by a first user, querying a second user to associate a label with the electronic message based on a cognitive state of the first user, and correlating the label with user data at a time of sending the electronic message, the user data corresponding to data output by at least one of a wearable, and an external sensor in a database.

Even further, in another exemplary embodiment, the present invention can provide a non-transitory computer-readable recording medium recording a cognitive state prediction program, the program causing a computer to perform: receiving an electronic message sent by a first user, querying a second user to associate a label with the electronic message based on a cognitive state of the first user, and correlating the label with user data at a time of sending the electronic message, the user data corresponding to data output by at least one of a wearable, and an external sensor in a database.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
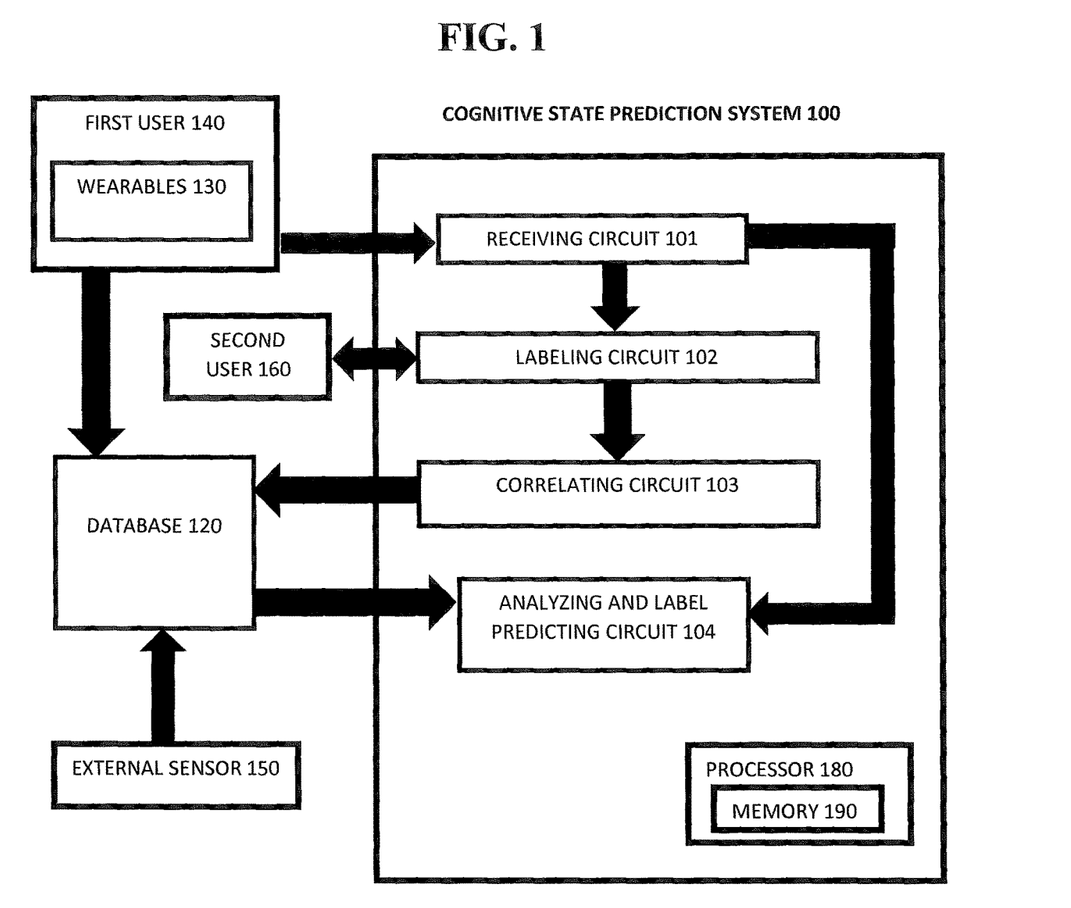
FIG. 1 exemplarily shows a block diagram illustrating a configuration of a cognitive state prediction system 100.

With reference now to FIG. 1, the cognitive state prediction system 100 includes a sending circuit 101, a labeling circuit 102, a correlating circuit 103, and an analyzing and predicting circuit 104. The cognitive state prediction system 100 includes a processor 180 and a memory 190, with the memory 190 storing instructions to cause the processor 180 to execute each circuit of cognitive state prediction system 100. The processor and memory may be physical hardware components, or a combination of hardware and software components.

Although the cognitive state prediction system 100 includes various circuits, it should be noted that a cognitive state prediction system can include modules in which the memory 190 stores instructions to cause the processor 180 to execute each module of cognitive state prediction system 100.

Also, each circuit can be a stand-alone device, unit, module, etc. that can be interconnected to cooperatively produce a transformation to a result.

With the use of these various circuits, the cognitive state prediction system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 3:
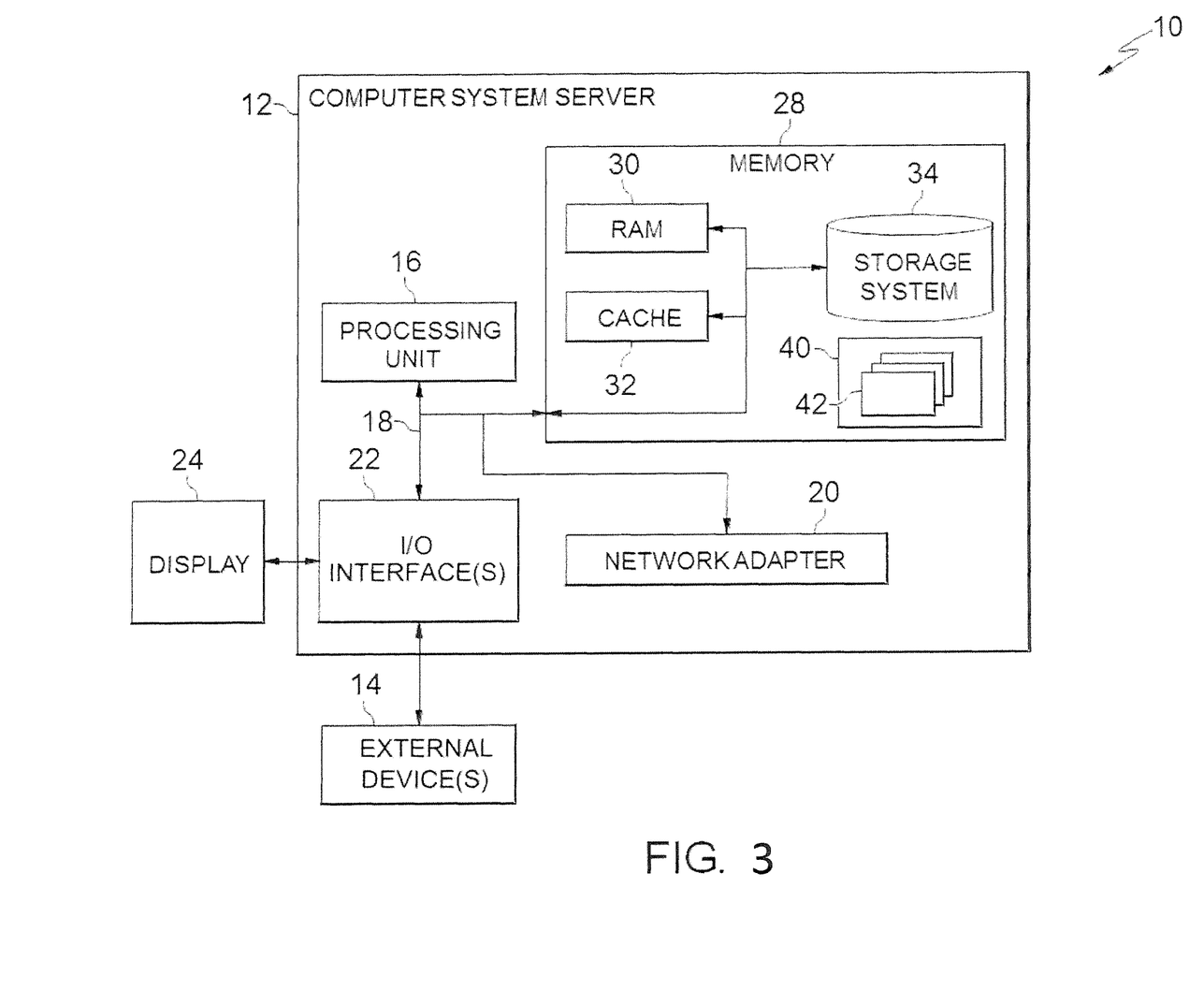
FIG. 3 depicts a cloud computing node 10 according to an exemplary embodiment of the present invention.
Figure 4:
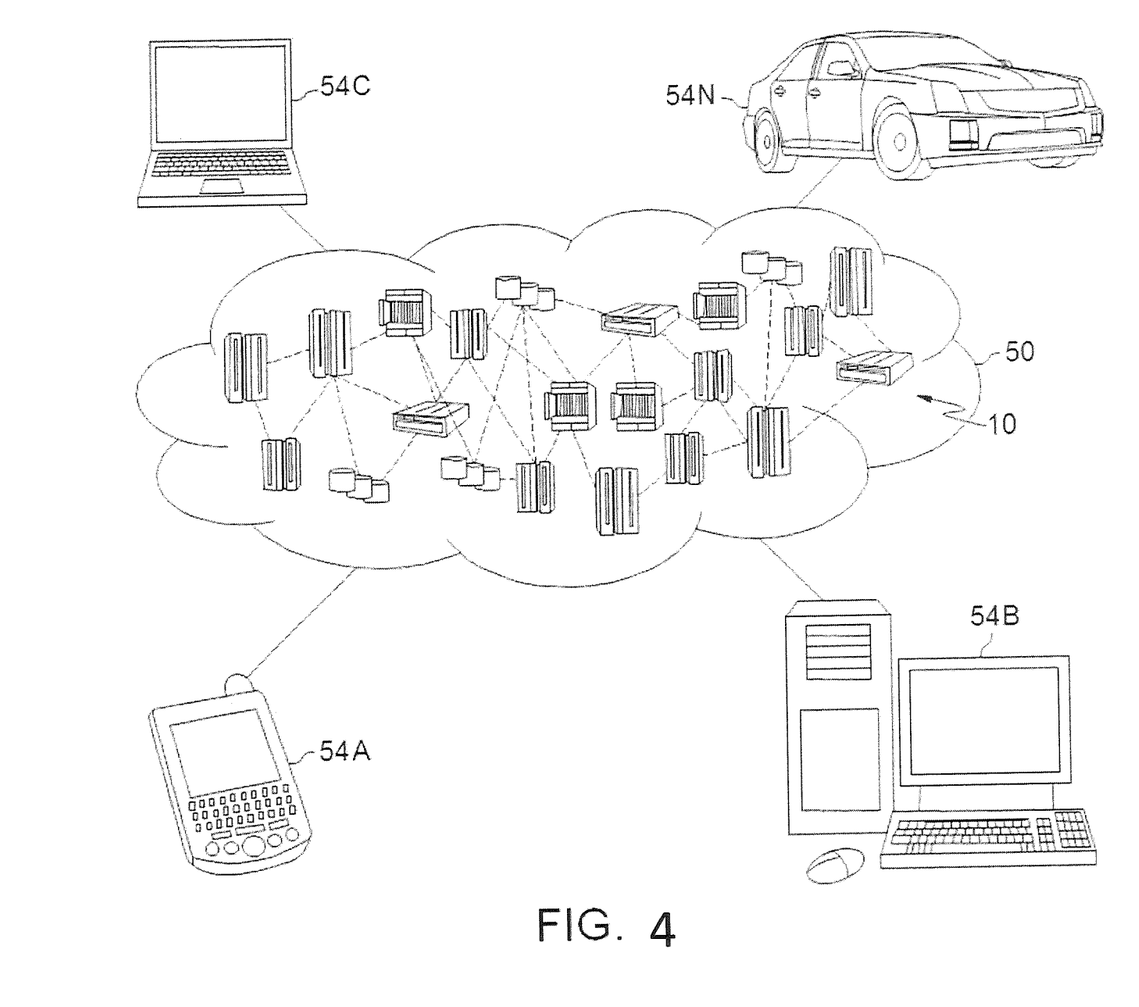
FIG. 4 depicts a cloud computing environment 50 according to another exemplary embodiment of the present invention.
Figure 5:
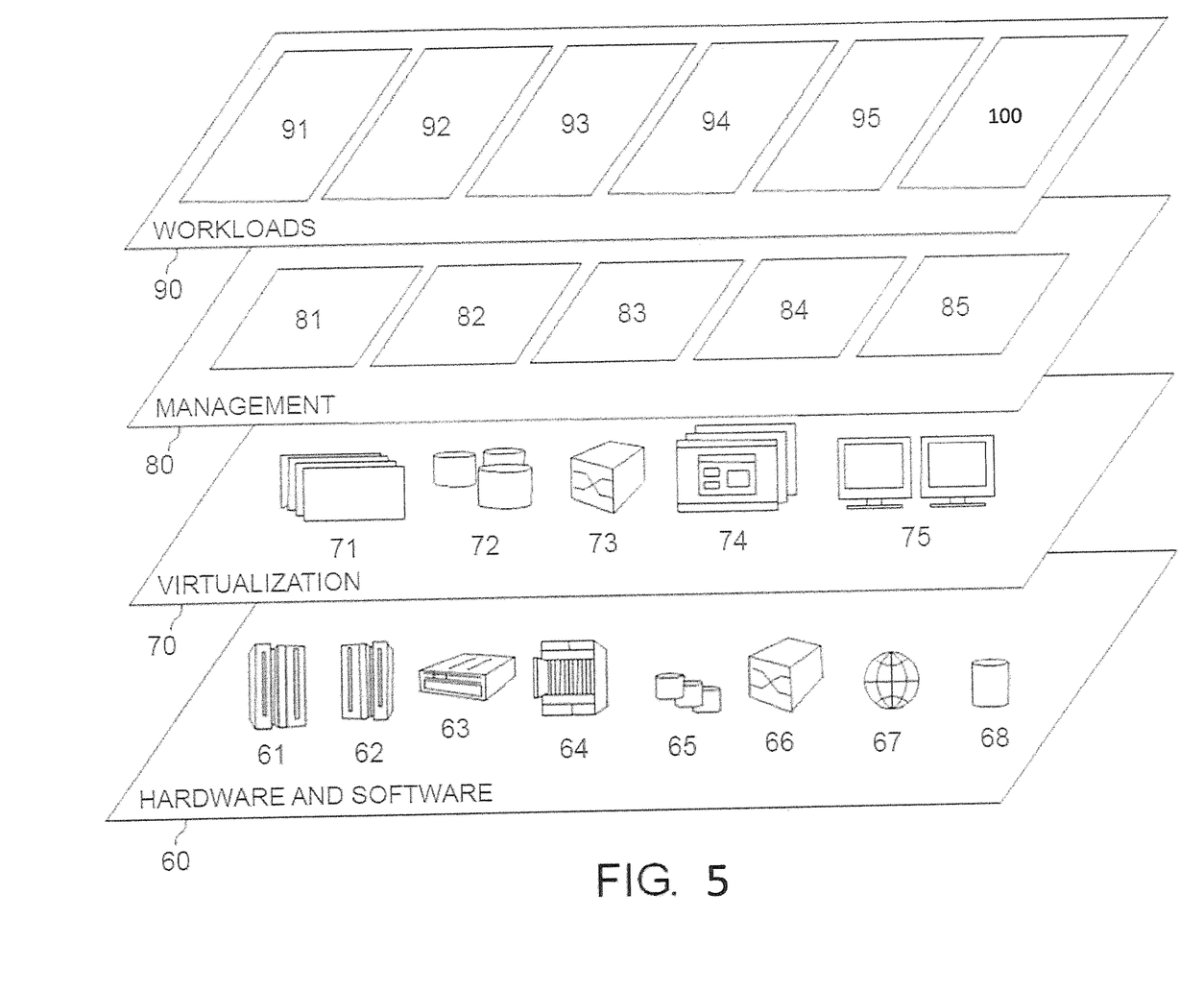
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the cognitive state prediction system 100 (FIG. 5), it is noted that the present invention can be implemented outside of the cloud environment.

A first user 140 sends an electronic message to the cognitive state prediction system 100 in which the receiving circuit 101 receives the electronic message. The electronic message can be any of, but not limited to, instant message, email, chat on a smartphone, phone call, videophone call, etc. and the label may optionally be partially dependent on (or take into account) the mode of message transmission by the sender. That is, the mode of message transmission may play a role in, shape, or give clues as to the sender's cognitive context, and therefore contribute to the sender's cognitive state or to the appropriate interpretation by the recipient (i.e., a message from a cell-phone vs. a desktop computer with a keyboard).

Simultaneously to the sending of the message, the wearables 130 or the external sensor 150 transmits user with data to be stored in the database 120. The user data collected by the wearables 130 or the external sensor 150 includes any type of data that can be used to predict the cognitive context of the user including, but not limited to, glucose monitors, blood pressure monitors, electrocardiogram (ECG) monitors, breathing, monitor heart, stress, perspiration levels, facial expressions, and the like.

The receiving circuit 101 communicates with the labeling circuit 102 to query a second user 160 to label the electronic message with a particular cognitive state (i.e., a label) that the second user 160 interprets the electronic message to mean according to existing preconceived notions, memories, focus of attention, and subjective states that the second user 160 previously knows about the first user 140. That is, the labeling circuit 102 associates a cognitive state with each particular electronic message received by the receiving circuit 101 based on an interpretation of the electronic message by the second user 160. Examples of the cognitive state label can be, but not limited to, irritated, angry, happy, sarcastic, impatient, curious, tired, bored, absent minded, preoccupied, confused, puzzled, etc.

The correlating circuit 103 correlates the label of the labeling circuit 102 with the user data stored in the database 120. The correlation of the label and the user data in the database 120 can be done by the correlating circuit 103 according to a time stamp of the data from the wearables 130 (and/or the external sensor 150) and the electronic message, for example. It is noted that a text message which occurs in a short period of time can be associated with temporal input from wearables 130 and external sensors 150. However, a phone conversation can last many minutes during which the speaker may experience different cognitive states. Therefore, before labeling 102 is applied the phone conversation the speech is be parsed into segment that roughly matches the temporal labels coming from the wearables 130 and external sensors 150. By this, the phone conversation is transformed into data points with labels that can be correlated by the correlating circuit 103 with the user data stored in the database 120.

Although the above embodiment included a query to the second user 160 to label the cognitive state of the first user 140, the labeling circuit 102 can query the first user 140 to volunteer a cognitive state label along with the electronic message. Also, not only is the second user 160 queried regarding a label, but optionally one or more other people may be queried (such as team members, a social network, a caregiver of a person with autism, etc.).

The first user 140 may refer to a composite sender, such as a team, a husband-wife dyad, or a manager-employee dyad who are involved in the sending of a message. That is, sometimes it is the case that collaborators are on the phone together, or that messages are composed in consultation with more than one person, and the receiving circuit 101 will receive this information and convey it to the second user 160 such that the second user 160 can determine a label accordingly when queried by the labeling circuit 102.

Further, the labeling circuit 102 can suggest a label to the second user 160 to confirm based on an "emoji" (i.e., an icon expressing some type of emotion or feeling) used in the electronic message. Also, after the user data and the label are correlated in the database 120, the first user 140 can edit the database to correct a label if the second user 160 incorrectly interpreted the cognitive state of the electronic message.

The cognitive state prediction system 100 continuously receives electronic messages from the first user 140, queries the second user 160 to label the cognitive state of the first user 140 via the labeling circuit 102, and correlates the label of the cognitive state of the first user 140 with the data output from the wearables 130 or the external sensor 150 at the time that the electronic message was sent. In this manner, the cognitive state prediction system 100 creates a database 120 customized for the first user 140 such that the cognitive state prediction system 100 can analyze each future electronic message sent by the first user 140 and predict the cognitive state of the first user 140 such that a different user can receive the electronic message with a cognitive state label so as to assist in correctly reading the electronic message in view of the cognitive state of the first user 140.

That is, the analyzing and label predicting circuit 104 of the cognitive state prediction system 100 analyzes the user data in the database 120, analyzes the current user data of the first user 140 output by the wearables 130 or the external sensor 150 associated with the current electronic message, and predicts a current cognitive state of the first user 140 to send to the recipient of the electronic message to assist the recipient with interpreting the electronic message.

The analyzing and label predicting circuit 104 outputs a predicted label with the electronic message that is associated with certain confidence levels, and these levels may be used to weight the different label assignments. For example, the analyzing and label predicting circuit 104 can output that it is 85% likely that the first user 140 is frustrated, 10% likely that the first user 140 is sarcastic, and 5% likely that the first user 140 is sad. Thus, the recipient can determine an appropriate way to interpret the meaning of the electronic message based on the cognitive state confidence levels while understanding that there is a chance that the first user 140 is sad or sarcastic even though there is a greater chance that it is a "frustrated" electronic message.

It is noted that the user can be experiencing multiple cognitive states such that the analyzing and label predicting circuit 104 can output multiple labels with a high percentage likelihood. For example, if a user is 99% likely to be sad the user may also be 95% likely to be upset. Thus, the user can have multiple cognitive states and the analyzing and label predicting circuit 104 outputs the likelihood that a cognitive state is occurring.

The database 120 is described above as being an external database from the cognitive state prediction system 100. In this manner, the database 120 can be accessed by different recipients (i.e., a cloud database) and each first user 140 can have a customized database 120 for their user data such that every new recipient can receive the cognitive state label with the electronic message. However, the invention is not limited to an external database. That is, the database 120 can be a storage unit of the system 100.

Further, the database 120 can be pre-configured with label characteristics that are best for different cohorts (i.e., classes of user(s) based on a medical condition, geographical location, demographic, etc.) so that other users and classes of user can benefit as the system 100 learns. In one of many possible embodiments, a user may actually tap on a certain label characteristic when the user "likes" it. In other embodiments, the system may determine (with a certain level of confidence) that a sender or receiver is becoming impatient, nervous, etc.

As noted above, the mode of transmission of the message may help the second user 160 label the cognitive state of the electronic message. For example, if the first user 140 responds to a long message with "k", the second user 160 may assume that the first user 140 is "annoyed" and label the cognitive state as such. However, the mode of transmission of the message can be sent to the receiving circuit 101 with the electronic message such that the second user 160 can see that the first user 140 is using a cell phone instead of a computer with keyboard. Thus, the first user's response may be different depending upon the device being used to transmit the message.

Indeed the mode of transmission is important as a laptop vs. a cell phone, however, the age of user is more preferably used. For example, most teenagers will communicate in "SMS" jargon even when using a laptop. Another factor is the context of the dialogue—between friends communication will be less formal than communication with a superior.

Also, an electronic calendar can be accessed by the receiving circuit 101 to feed the data to the second user 160 to better make a label decision. Electronic calendars often have rich information on meeting topics or participants and a history of encounters. Such information may also be used to glean additional context such as possible fatigue levels and may be used to aid in the interpretation of the wearable time series information and recipient labeling process. For example, if the first user 140 is in traffic or was just in back-to-back meetings, the second user 160 will be made aware of this and be able to adjust the label of the electronic message accordingly.

To better assess a user's cognitive state, the external fields would also be assessed. These additional factors would measure the intersection point between a person's perceived umwelt by identifying various fields inclusive of electromagnetic activity as well as convergent and divergent points. In addition, perceptual factors in interaction modeling and neuromodulation in response to external stimuli would be evaluated, especially spatial cross-modal effects. 140, environmental observations would also integrate one's social network giving validity based on relational dynamics.

Based on the above exemplary embodiments, the cognitive state prediction system 100 can allow a recipient to receive an immediate prediction of the cognitive state of the sender without having to interpret or build evidence through traditional social networking, follow-on messaging, or through unreliable means such as text analysis.

Further, text analytics may provide clues as to the disposition of the sender, but the system 100 can make use of a whole range of other data, labeled by the expert recipient (with good knowledge of the sender's state) in order to interpret the cognitive context. That is, the system 100 can define multi-variate correlations of the user's cognitive state, further identifying an individual's point of homeostasis inclusive of their resting state. Once this point has been determined, fluctuations may also support causal identifications.

Also, the database 120 is continuously updated based on labels from the second user 160 such that the system 100 improves over time, as more analytics are developed, and as evidence is built up linking certain wearables data to certain recipient specified labels.

Figure 2:
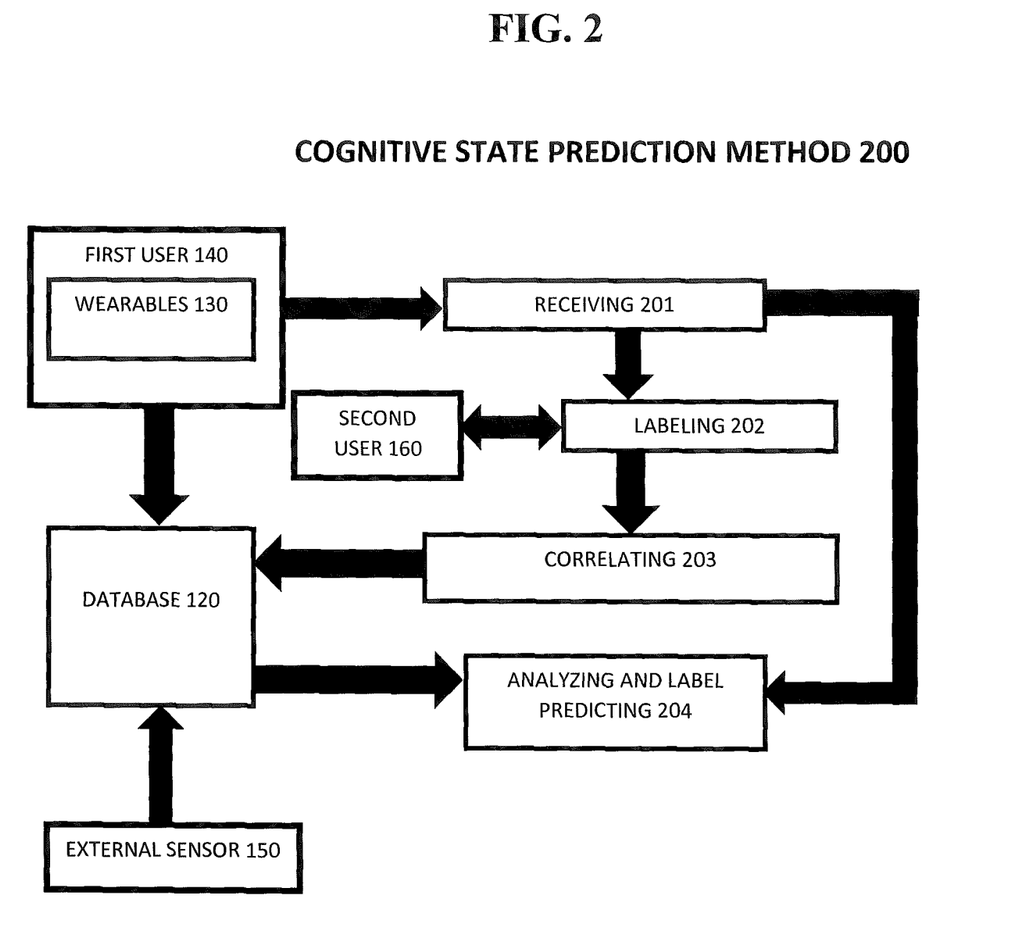
FIG. 2 exemplarily shows a high level flow chart for a cognitive state prediction method 200.

FIG. 2 shows a high level flow chart for a method 200 of cognitive state prediction.

A first user 140 sends an electronic message in which the receiving circuit 101 receives the electronic message.

Step 201 communicates with the Step 202 to query a second user 160 to label the electronic message with a particular cognitive state (i.e., a label) that the second user 160 interprets the electronic message to mean according to existing preconceived notions, memories, focus of attention, and subjective states that the second user 160 previously knows about the first user 140. That is, Step 202 associates a cognitive state with each particular electronic message received by Step 201 based on an interpretation of the electronic message by the second user 160

Step 203 correlates the label of Step 202 with the user data stored in the database 120. The correlation of the label and the user data in the database 120 can be done by Step 203 according to a time stamp of the data from the wearables 130 (and/or the external sensor 150) and the electronic message, for example.

Step 204 analyzes the user data in the database 120, analyzes the current user data of the first user 140 output by the wearables 130 or the external sensor 150 associated with the current electronic message, and predicts a current cognitive state of the first user 140 to send to the recipient of the electronic message to assist the recipient with interpreting the electronic message.

Step 204 outputs a predicted label with the electronic message that is associated with certain confidence levels, and these levels may be used to weight the different label assignments Exemplary Hardware Aspects, Using a Cloud Computing Environment It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the cognitive state prediction system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A cognitive state prediction system, comprising:
a processor; and
a memory operably coupled to the processor, the memory storing instructions to cause the processor to perform:
receiving an electronic message sent by a first user;
simultaneously to the receiving of the message, storing first user data associated with a time of the reception of the electronic message in a database as transmitted by at least one of the wearable and the external sensor;
querying a second user to associate a label as an initial label with the electronic message based on a cognitive state of the first user as perceived by the second user and prior information known by the second user about the first user; and
correlating the label by the second user with the first user data at a time of sending the electronic message;
analyzing the first user data stored in the database and the label by the second user of the cognitive state of the first user;
analyzing a current cognitive state of the first user based on current first user data being detected by the at least one of the wearable and the external sensor; and
predicting a second label of the current cognitive state of the first user to send with a next electronic message being sent by the first user based on a comparison of the analyzing the first user data and the label by the second user of the cognitive state of the first user with the analyzing the current cognitive state of the first user.

2. The system of claim 1, wherein further comprising querying the first user to confirm that the label input by the second user is correct for the electronic message.

3. The system of claim 1, wherein the database comprises an external database.

4. The system of claim 1, wherein the database includes pre-configured labels associated with user data of a cohort.

5. The system of claim 1, wherein the user data detected by at least one of the external sensor and the wearable includes at least one of:
a glucose level;
blood pressure;
electrocardiogram (ECG);
a breathing status;
a heart rate;
a stress level;
a perspiration level;
a facial expression;
a measurement of a body movement;
an eye movement; and
a voice characteristic.

6. The system of claim 1, wherein the cognitive state of the first user that the second user associates the label with the electronic message comprises an interpreted cognitive state of the first user by the second user based on prior information known by the second user about the first user.

7. The system of claim 1, wherein the user data further includes data corresponding to a mode of the sending of the electronic message by the first user.

8. A cognitive state prediction method comprising:
receiving an electronic message sent by a first user;
simultaneously to the receiving of the message, storing first user data associated with a time of the reception of the electronic message in a database as transmitted by at least one of the wearable and the external sensor;
querying a second user to associate a label as an initial label with the electronic message based on a cognitive state of the first user as perceived by the second user and prior information known by the second user about the first user; and
correlating the label by the second user with the first user data at a time of sending the electronic message;
analyzing the first user data stored in the database and the label by the second user of the cognitive state of the first user;
analyzing a current cognitive state of the first user based on current first user data being detected by the at least one of the wearable and the external sensor; and predicting a second label of the current cognitive state of the first user to send with a next electronic message being sent by the first user based on a comparison of the analyzing the first user data and the label by the second user of the cognitive state of the first user with the analyzing the current cognitive state of the first user.

9. The method of claim 8, wherein the querying further queries the first user to confirm that the label input by the second user is correct for the electronic message.

10. The method of claim 8, wherein the database includes pre-configured labels associated with user data of a cohort.

11. A non-transitory computer-readable recording medium recording a cognitive state prediction program, the program causing a computer to perform:
receiving an electronic message sent by a first user;
simultaneously to the receiving of the message, storing first user data associated with a time of the reception of the electronic message in a database as transmitted by at least one of the wearable and the external sensor;
querying a second user to associate a label as an initial label with the electronic message based on a cognitive state of the first user as perceived by the second user and prior information known by the second user about the first user; and
correlating the label by the second user with the first user data at a time of sending the electronic message;
analyzing the first user data stored in the database and the label by the second user of the cognitive state of the first user;
analyzing a current cognitive state of the first user based on current first user data being detected by the at least one of the wearable and the external sensor; and
predicting a second label of the current cognitive state of the first user to send with a next electronic message being sent by the first user based on a comparison of the analyzing the first user data and the label by the second user of the cognitive state of the first user with the analyzing the current cognitive state of the first user.

\* \* \* \* \*